US009805480B2

(12) United States Patent
Ahn et al.

(10) Patent No.: US 9,805,480 B2
(45) Date of Patent: Oct. 31, 2017

(54) METHOD OF CORRECTING COLOR BRIGHTNESS OF IMAGE, OF DISPLAY APPARATUS, AND APPARATUS FOR CORRECTING COLOR BRIGHTNESS IN THE DISPLAY OF IMAGE

(71) Applicant: SAMSUNG DISPLAY CO., LTD., Yongin, Gyeonggi-Do (KR)

(72) Inventors: Kuk-Hwan Ahn, Hwaseong-si (KR); Jai-Hyun Koh, Hwaseong-si (KR); Heendol Kim, Yongin-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 104 days.

(21) Appl. No.: 14/466,683

(22) Filed: Aug. 22, 2014

(65) Prior Publication Data
US 2015/0213627 A1 Jul. 30, 2015

(30) Foreign Application Priority Data

Jan. 24, 2014 (KR) ........................ 10-2014-0009031

(51) Int. Cl.
*G09G 5/02* (2006.01)
*G06T 11/00* (2006.01)

(52) U.S. Cl.
CPC ................................. *G06T 11/001* (2013.01)

(58) Field of Classification Search
CPC G09G 5/02; G09G 1/285; G09G 5/06; H04N 9/641; G06F 3/14
USPC ........................................................ 345/603
See application file for complete search history.

(56) References Cited

U.S. PATENT DOCUMENTS 8,049,763 B2 * 11/2011 Kwak .................... G09G 5/02
345/589
8,189,016 B2 * 5/2012 Higgins ............... G09G 3/3406
345/102
8,730,273 B2 * 5/2014 Chu-Ke ............... G09G 3/3406
345/690

(Continued)

FOREIGN PATENT DOCUMENTS

JP      2008-131349    6/2008
KR      10-1322034    10/2013

OTHER PUBLICATIONS

"Scene-Adaptive RGB-to-RGBW Conversion Using Retinex Theory-Based Color Preservation" (Journal of Display Technology, vol. 8, No. 12, Dec. 2012, by Kyung Joon Kwon, and Young Hwan Kim).*

(Continued)

*Primary Examiner* — Ke Xiao
*Assistant Examiner* — Gordon Liu
(74) *Attorney, Agent, or Firm* — F. Chau & Associates, LLC

(57) ABSTRACT

A method of driving an image includes receiving fundamental image data that includes a plurality of first main colors; converting the fundamental image data into output image data that includes a plurality of second main colors; calculating corrected brightness values of the second main colors that correct a decreased apparent brightness of the second main colors when the first main colors include a saturated color; and delaying application of the calculated corrections based on a brightness decrease speed that is determined based on at least one of an image change speed and an image change level.

18 Claims, 20 Drawing Sheets

(56) References Cited

U.S. PATENT DOCUMENTS

| | | | |
|---|---|---|---|
| 9,177,509 B2 * | 11/2015 | Kerofsky | G09G 3/3426 |
| 2011/0181567 A1 * | 7/2011 | Tanba | G09G 5/00 |
| | | | 345/207 |
| 2014/0071174 A1 * | 3/2014 | Kim | G09G 5/10 |
| | | | 345/690 |

OTHER PUBLICATIONS

English Abstract Publication No. 10-2010-0074921 (for 10-1322034).

* cited by examiner

METHOD OF CORRECTING COLOR BRIGHTNESS OF IMAGE, OF DISPLAY APPARATUS, AND APPARATUS FOR CORRECTING COLOR BRIGHTNESS IN THE DISPLAY OF IMAGE

CROSS-REFERENCE TO RELATED APPLICATIONS

This U.S. non-provisional patent application claims priority under 35 U.S.C. §119 from Korean Patent Application No. 10-2014-0009031, filed on Jan. 24, 2014 in the Korean Intellectual Property Office, and all the benefits accruing therefrom, the contents of which are herein incorporated by reference in their entirety.

BACKGROUND

Embodiments of the present disclosure disclosed herein are directed to a method for driving an image and an apparatus for driving an image using the method, and more particularly, to a method for driving an image and an apparatus for driving an image using a method that corrects color.

Typically, RGB data, including red R, green G and Blue B, has been used to represent an image and a pixel structure that represents the image on a screen has also frequently used a structure that includes an RGB pixel.

However, to increase screen display quality, data may be converted into an image that includes different colors as main colors, and is displayed through a corresponding pixel structure.

Since the main colors included in each step differ from each other, the brightness of a represented color may be distorted. For example, when an RGB color structure is changed by including a white pixel or by including separate cyan and yellow pixels and then displaying a color, the brightness of the displayed color may increase or decrease compared to a typical brightness, depending on each represented color.

In particular, when a white image and a yellow image are displayed, there is an effect that when the brightness of the white image sharply increases, the color of the yellow image appears darker even though the yellow image may have the same brightness. When distortion due to such image conversion arises, an image different from an originally intended image may be displayed.

SUMMARY

Embodiments of the present disclosure provide a method of driving an image to correct a color.

Embodiments of the present disclosure also provide an apparatus for driving an image using a method of driving the image.

Embodiments of the present disclosure provide methods of driving an image, including: receiving fundamental image data that includes a plurality of first main colors; converting the fundamental image data into output image data that includes a plurality of second main colors; calculating corrected brightness values of the second main colors that correct a decreased apparent brightness of the second main colors when the first main colors include a saturated color; and delaying application of the calculated corrections based on a brightness decrease speed that is determined based on at least one of an image change speed and an image change level.

In some embodiments, the first main colors may be red, green, and blue, and the second main colors may include white.

In other embodiments, delaying application of the calculated corrections may include: detecting an image change speed based on a histogram analysis of the output image data; and determining a brightness decrease speed in proportion to the image change speed.

In still other embodiments, detecting the image change speed may include determining a number of times the second main colors change from a saturated color to a non-saturated color or vice versa for a preset frame section.

In even other embodiments, delaying application of the calculated corrections may include: detecting an image change level based on a histogram analysis of the output image data; and determining a brightness decrease speed in proportion to the image change level.

In yet other embodiments, detecting the image change level may include comparing a ratio of saturated colors in the output image data of a previous frame with a ratio of saturated colors in the output image data of a current frame.

In further embodiments, delaying application of the corrections may include: detecting an image change speed based on a histogram analysis of the output image data; detecting an image change level based on a histogram analysis of the output image data; and determining a brightness decrease speed in proportion to the image change speed and the image change level.

In still further embodiments, calculating corrected brightness values of the second main colors may include: examining saturated colors by analyzing a degree of saturation of each of the second main colors of the output image data; determining a decrease ratio of a brightness value of a saturated color; and calculating a corrected brightness value of the second main colors of the output image data using the determined decrease ratio.

In even further embodiments, a saturated second main color of the output image data may be yellow.

In other embodiments of the present disclosure, an apparatus for driving an image includes: a color mapping unit for receiving fundamental image data that includes a plurality of first main colors and for converting received data into output image data that includes a plurality of second main colors; a saturated color correcting unit for performing a histogram analysis on the output image data and for outputting a histogram analysis result, wherein the saturated color correcting unit determines a brightness decrease ratio of a saturated second main color based on the histogram analysis result; a correction delaying unit for determining a brightness decrease speed based on at least one of an image change speed and an image change level that are detected based on the histogram analysis result; and a data modulating unit for generating modulated image data by decreasing brightness values of the plurality of second main colors of the output image data based on the brightness decrease ratio and the brightness decrease speed.

In some embodiments, the saturated color correcting unit may include: a saturated color examining unit for analyzing a degree of saturation of each of the second main colors of the output image data and for outputting the histogram analysis result; and a decrease ratio determining unit for determining a brightness decrease ratio of a saturated second main color based on the histogram analysis result.

In other embodiments, the correction delaying unit may include: a speed detecting unit for detecting an image change speed based on the histogram analysis result; a change level detecting unit for detecting an image change level based on the histogram analysis result; and a speed determining unit for determining a brightness decrease speed in proportion to the image change speed and the image change level.

In still other embodiments, the apparatus may include: a display panel including gate lines and data lines, wherein the gate lines and the data lines are insulated from each other and cross each other; a timing controller for receiving fundamental image data and a control signal, and for generating modulated image data, a first control signal, and a second control signal, where the image driving apparatus is part of the timing controller; a gate driver for outputting to the gate lines, gate signals generated based on the first control signal; and a data driver for outputting, to the data lines, data voltage obtained from the modulated image data based on the second control signal Embodiments of the present disclosure provide methods of driving an image, including examining saturated colors of a plurality of second main colors of an output image data by analyzing a degree of saturation of each of the second main colors of the output image data; determining a decrease ratio of a brightness value of a saturated color of the second main colors; calculating a corrected brightness value of the second main colors of the output image data using the determined decrease ratio; and delaying application of the corrected brightness values based on a brightness decrease speed that is determined in proportion to at least one of an image change speed and an image change level.

In some embodiments, the method includes receiving fundamental image data that includes a plurality of first main colors; and converting the fundamental image data into the output image data that includes the plurality of second main colors.

In some embodiments, examining saturated colors of a plurality of second main colors of output image data further includes performing a histogram analysis on the output image data and outputting a histogram analysis result, wherein the brightness value decrease ratio of a saturated second main color is determined based on the histogram analysis result.

In some embodiments, delaying application of the corrected brightness values further includes determining the brightness decrease speed based on at least one of an image change speed and an image change level that are detected based on the histogram analysis result.

In other embodiments, detecting the image change speed includes determining a number of times the second main colors change from a saturated color to a non-saturated color or vice versa for a preset frame section.

In other embodiments, detecting the image change level includes comparing a ratio of saturated colors in the output image data of a previous frame with a ratio of saturated colors in the output image data of a current frame.

In other embodiments, a saturated second main color of the output image data is yellow.

DETAILED DESCRIPTION OF EXEMPLARY EMBODIMENTS

The above characteristics of embodiments of the present disclosure will be easily understood through the following embodiments to be described with reference to the accompanying drawings. However, the present disclosure is not limited embodiments to be described below but may be implemented in other forms.

Figure 1:
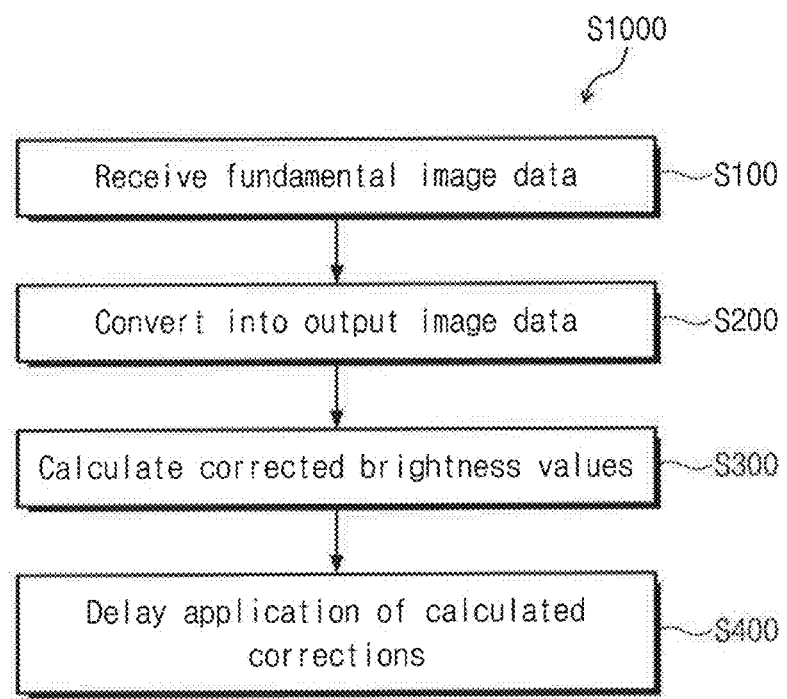
FIG. 1 is a flowchart of a method of driving an image according to an embodiment of the present disclosure.

FIG. 1 is a flowchart of a method of driving an image according to an embodiment of the present disclosure.

Referring to FIG. 1, a method S1000 of driving an image according to an embodiment of the present disclosure includes receiving fundamental image data in step S100, converting the received data into an output image data in step S200, calculating corrected saturated colors in step S300, and delaying application of the correction in step S400.

In step S100 of receiving the fundamental image data, fundamental image data that includes a plurality of first main colors is received. The three main colors may be red, green and blue RGB colors.

Regarding step S200 of converting the received data into an output image data, there may be various methods of storing or transmitting an image, and there may be various method of outputting an image. For example, although the fundamental image data may be an RGB type, the output image data to be displayed on a screen may be an RGBW or RGBCY type. The RGBW type is an output image type that includes a white main color in addition to the red, green and blue main colors, and the RGBCY is an output image type that further includes cyan and yellow colors in addition to the red, green and blue colors. Thus, the plurality of first main colors of the fundamental image data may be converted into output image data that includes a plurality of second main colors different from the plurality of first main colors.

Since the fundamental image data and the output image data have different categories and numbers of main colors, there may be an error in representing the colors.

Thus, in step S300 of calculating corrected the saturated color, corrections of errors that may occur in the output image data are calculated. In step S300, corrections of errors that occur in the output image data due to a saturated color are calculated.

In step S400 of delayed correction, the application of the corrections calculated in step S300 is delayed. The reason for delaying the application of the corrections of step S300 is as follows. When one of the second main colors is saturated and immediately corrected, the apparent brightness of a background image quickly and sharply decreases as soon as the one of the colors on an existing screen is saturated. Then, a user is aware of the process of correcting the current screen and sees distorted colors the screen. Thus, the corrections calculated in step S300 may not be immediately applied and correction is applied after step S400 of delaying the correction. Thus, users are not aware of the correction of the saturated color.

Figure 2:
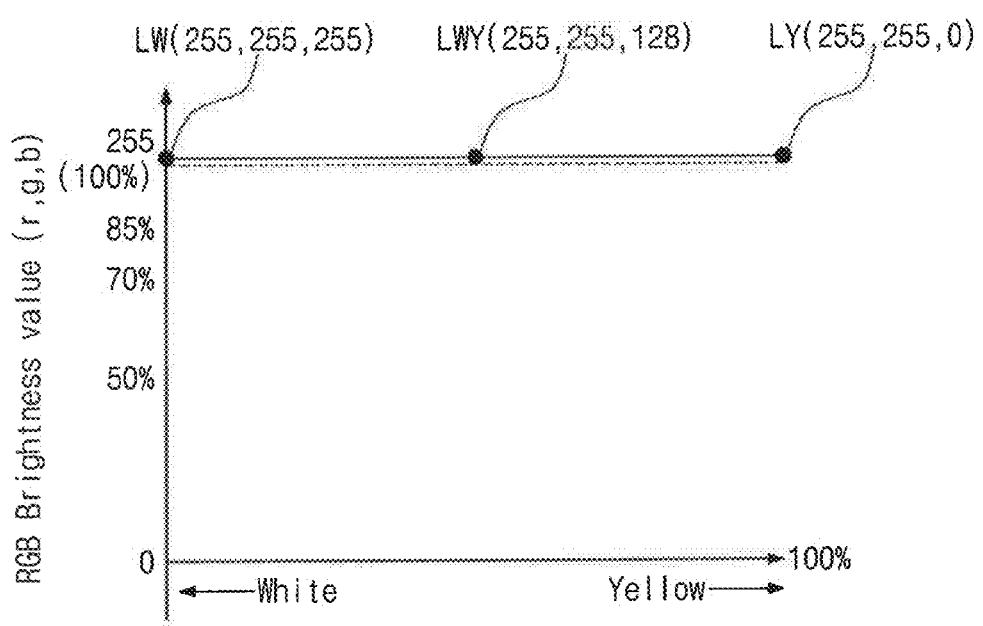
FIG. 2 is a graph of a distribution of fundamental image data according to an embodiment of the FIG. 1.

FIG. 2 is a graph of a distribution of fundamental image data according to an embodiment of the FIG. 1.

FIG. 2 shows a distribution of a white color point LW to a pure yellow point LY when the first main colors of the input data are red R, green G and blue B. The white color point LW has data values 255, 255, and 255 for red R, green G, and blue B, respectively. The white color point LW is in a state in which the red R, green G, and blue G main colors of input data have maximum values. When moving from the white color point LW to a pure yellow color point LY, a value corresponding to the blue B main color gradually decreases. The pure yellow color point LY has data values 255, 255, and 0 for the red R, green G, and blue B main colors, respectively. In addition, a white-yellow color point LWY has data values 255, 255, and 128 for the red R, green G, and blue B main colors, respectively.

Figure 3:
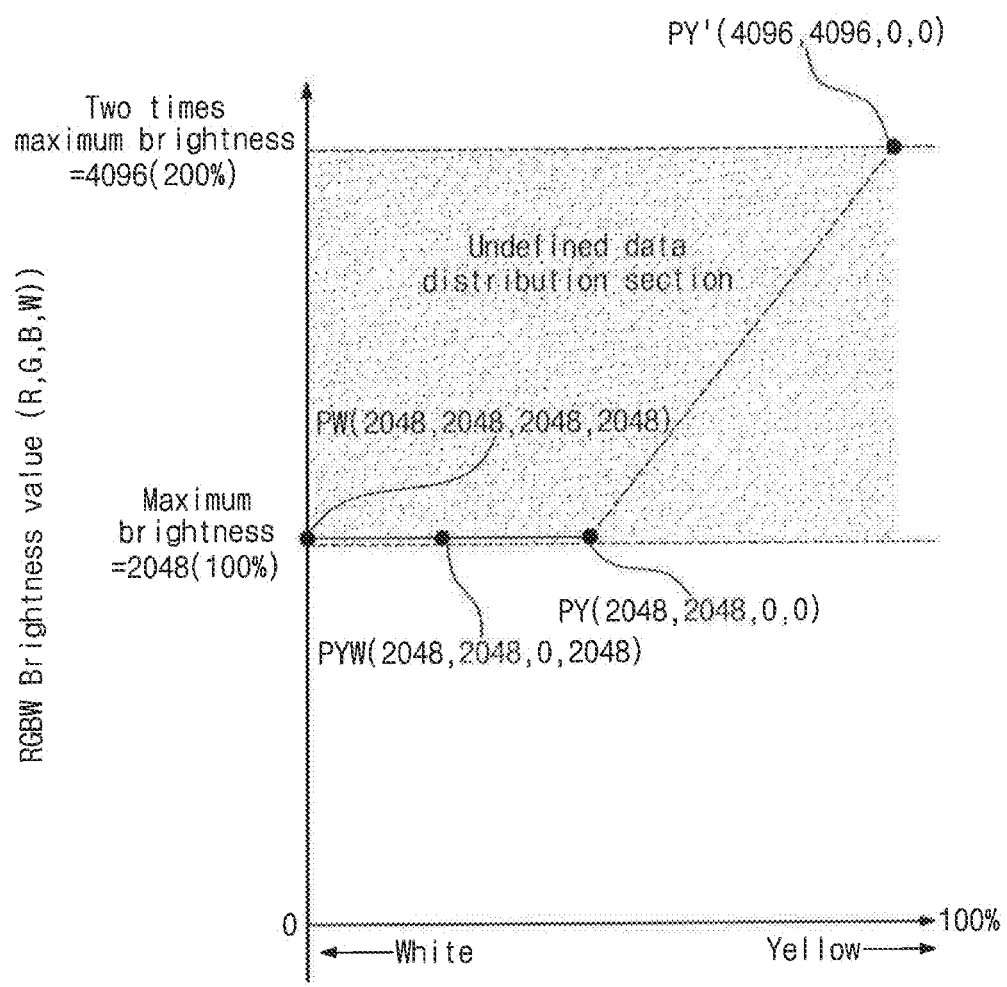
FIG. 3 is a graph of a distribution of output image data according to an embodiment of the FIG. 1.

FIG. 3 is a graph of a distribution of output image data according to the embodiment of the FIG. 1.

The output data distribution represented in FIG. 3 represents an input image data distribution shown in FIG. 2 as an output image data distribution value that has red R, green G, blue B and white W main colors. Unlike the input image data, the output image data includes red R, green G, blue G and white W as main colors. Thus, when representing white, an image is generated in which brightness includes white W in addition to the red R, green G, and blue G colors. A pure white color point LW as shown in FIG. 2 has data values 255, 255, and 255 for red R, green G, and blue B main colors, respectively. A corresponding pure white color point PW of the output image data may have data values 2048, 2048, 2048 and 2048 for red R, green G, blue B and white W, respectively. In this example, the value 255 or 2048 represents a maximum value of each image data, thus the magnitude of the value is not in itself significant but rather whether or not the value is a maximum value. In the case of a pure white color point PW of the output image data, the red R, green G, blue B and white W colors all have maximum values. In this case, white brightness generated by adding white W to a white brightness represented using only red R, green G and blue B colors generates a white image having twice the existing brightness value.

In addition, a pure yellow color point PY of the output image data has values 2048, 2048, 0 and 0 for red R, green G, blue B and white W, respectively. To represent pure yellow, only red R and green G should be represented and a separate white W should not be driven. In addition, a white-yellow color point PYW of the output image data has values 2048, 2048, 0 and 2048 for red R, green G, blue B and white W, respectively. The white-yellow point PYW corresponds to a color obtained by mixing white and yellow colors half and half.

Since a pure yellow color point PY generated to enable the output image data to represent a pure yellow color has values 2048, 2048, 0 and 0 for red R, green G, blue B and white W, respectively, only brightness by red R and green G colors is generated. This value corresponds to half the brightness of the pure white point PW. This is because brightness corresponding to white W is not generated.

In general, an image is represented with relative brightness values. For example, when an image having white and yellow is represented on the same screen, the pure white point PW and the pure yellow point PY of the output image data should be represented at the same brightness to represent the same image as fundamental image data. The reason is because the pure white point LW and the pure yellow point LY of the fundamental image data have the same brightness. Thus, to represent yellow with the same brightness as a pure white point PW of the output image data, an image should actually be represented with a value corresponding to a virtual yellow point PY'. The virtual yellow point PY' has values 4096, 4096, 0 and 0 for red R, green G, blue B and white W, respectively. Since a maximum value that each pixel may represent is 2048, this range of images may not be represented by an RGBW display apparatus. The range of images not represented is included in an undefined data distribution section. Thus, the output image data needs to represent corrected images of images included in the undefined data distribution section.

Figure 4:
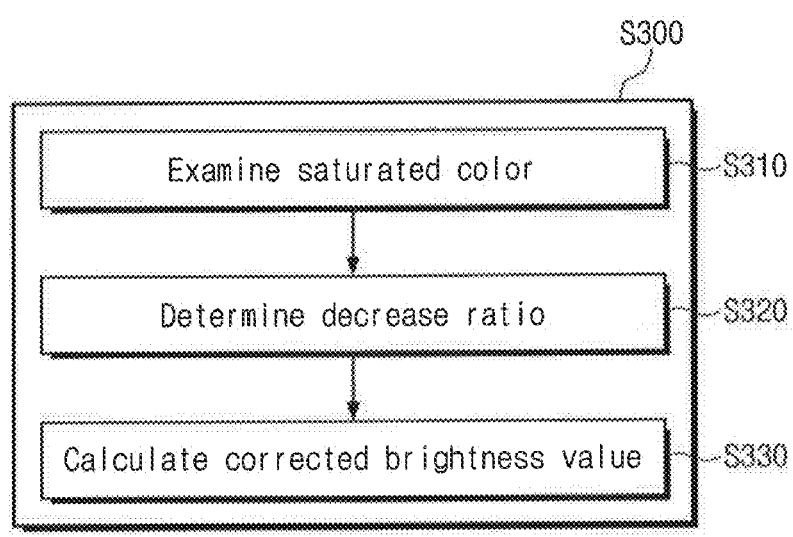
FIG. 4 is a flow chart of an operation of correcting a saturated color of FIG. 1.

FIG. 4 is a flow chart of an operation of calculating a corrected saturated color of FIG. 1.

Referring to FIG. 4, a method S300 of calculating a corrected saturated color according to a present embodiment includes examining a saturated color in step S310, determining a decrease ratio in step S320 and calculating a corrected brightness value in step S330.

In step S310, the degree of saturation of the second main colors of the output image data is analyzed. In this case, at step S310 a histogram analysis may be performed on the frame image data of the output image data. A saturated color is a color having a maximum brightness value. When each of the second main colors is saturated, the output image data distribution may have an unrepresentable undefined data distribution section as described with respect to FIG. 3. Since white brightness increases when the second main colors include a separate white, it is challenging to represent a color in hardware when one of the second main colors is saturated. Thus, in this case, all second main colors of the output image data should be corrected. A method of correcting the second main colors includes decreasing the brightness of all the second main colors by a same ratio and mapping a color from the undefined data distribution section to a representable region.

In step S320 of determining the decrease ratio of the brightness value of the saturated color, the brightness decrease ratio of the second main colors is determined. The brightness decrease ratio may have the same value for each color section, but also may have different ratios for each color section for more efficient correction. Thus, in a step of determining the decrease ratio, a section and brightness ratio are determined for which the second main colors are corrected.

In step S330 of calculating a corrected brightness value, the brightness values of the second main colors of the output image data are calculated using the determined decrease ratio. By using the decrease ratio determined in step S320, the brightness value of the second main colors decreases by the determined decrease ratio.

Figure 5:
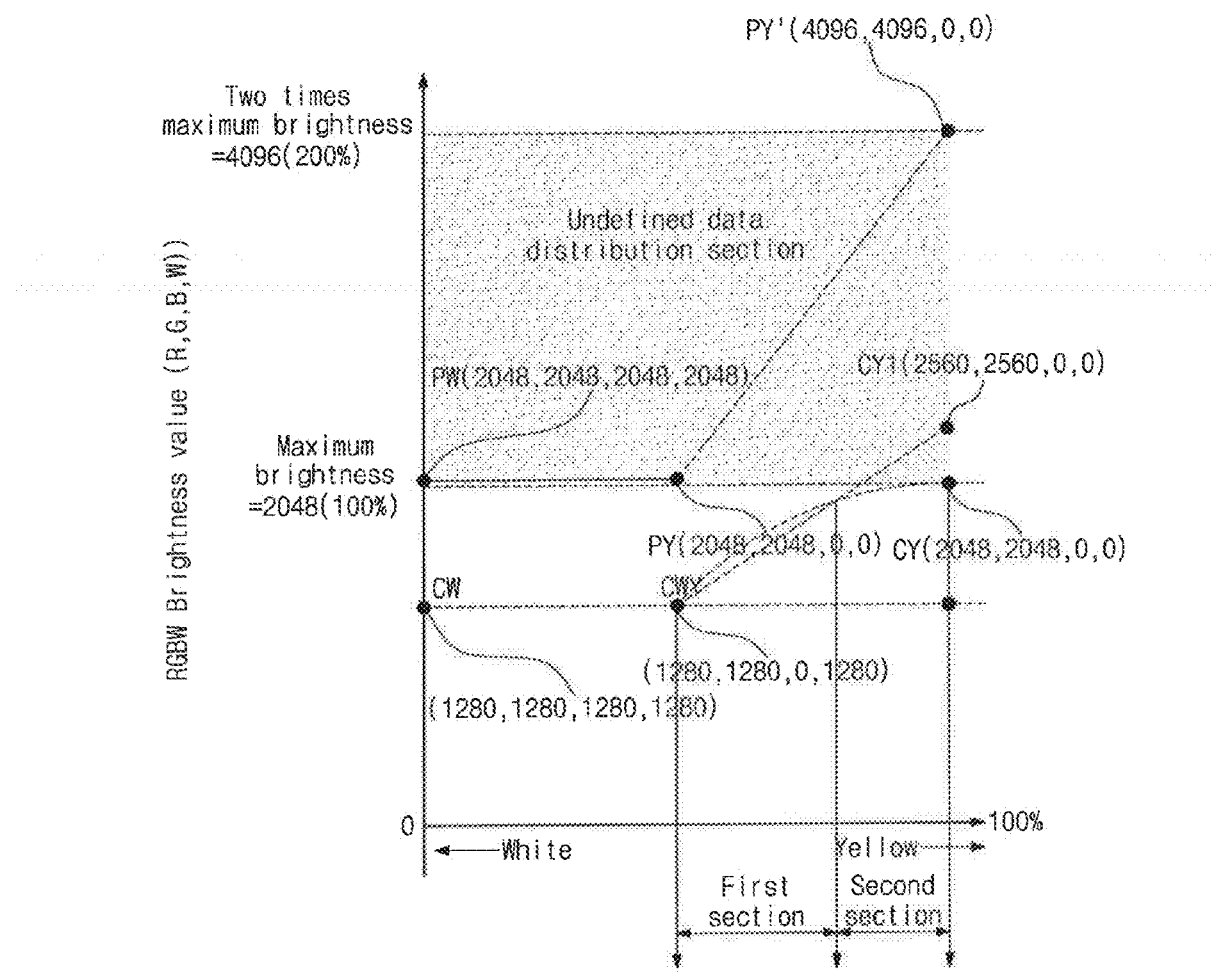
FIG. 5 is a graph of a distribution of output data according to an embodiment of the FIG. 4.

FIG. 5 is a graph of a distribution of output data according to an embodiment of the FIG. 4.

Referring to FIG. 5, a distribution of output image data calculated by step S330 is shown. In the output image data corrected by step S330, the brightness values of all colors are calculated to be decreased by the determined decrease ratio. For a corrected pure white point CW, the brightness of all the second main colors may decrease with respect to a pre-correction pure white point PW, and in the case of a post-correction white and yellow point CWY, the brightness of all the second main colors may decrease by a uniform ratio with respect to a pre-correction white-yellow point PWY.

Reviewing the post-correction pure white point CW, the red R, green G, blue B and white W main colors have values 1280, 1280, 1280 and 1280, respectively. These values are obtained by dividing the maximum brightness of the pre-correction pure white point PW by about 1.6, which corresponds to about 62.5% of the maximum brightness value. Thus, the post-correction pure white point CW represents a white whose brightness is about 62.5% of the brightness value of the pre-correction pure white point PW. In addition, the brightness decrease ratio is equally applied from the pure white point to the white-yellow point. The post-correction white-yellow point CWY values are determined by dividing the values of all second main colors of the pre-correction white-yellow point PWY by 1.6, namely, decreased to values corresponding to 62.5% brightness. Thus, the brightness of all the second main colors from the pure white point to the white-yellow point are decreased to about 62.5%. In this case, since all colors decrease by a uniform ratio, a represented color is the same and only the brightness of a color decreases. The uniform decrease ratio may be adjusted to a value equal to or higher than about, e.g., 70%. Since brightness decreases as a whole when the decrease ratio is too high, correction is performed to maintain a uniform ratio.

Since the pre-correction pure yellow point PY' is located in the undefined data distribution section as mentioned above, it may be challenging to represent a corresponding color with corresponding brightness. Thus, the color may be mapped to a section in which the pre-correction pure yellow point may be represented. The post-correction pure yellow point CY has values 2048, 2048, 0 and 0 for red R, green G, blue B and white W, respectively. The values of the post-correction pure yellow point CY are the maximum brightness points for yellow that may be represented by the same display apparatus. Thus, when an image includes a pure white and a pure yellow, only whole brightness decreases and the same color as the initial fundamental image data is output.

The post-correction pure yellow point CY and the post-correction white-yellow point CWY may have different decrease ratios depending on the location. The reason is that the post-correction white-yellow point CWY has values obtained by decreasing the values of all second main colors to about 62.5% and the post-correction pure yellow point CY has values equally representing the values of the second main colors. The decrease ratio value gradually increases for the continuous change between the two points. That is, correction is performed so that the points may continuously change.

In a present embodiment, by dividing a section between the white-yellow point and the pure yellow point into two sections, a first and a second section, and applying different ratios, the brightness values of the second main colors decrease. The decrease ratio decreases more quickly with a steep slope in the first section than in the second section, and the decrease ratio decreases with a more gentle slope in the second section. If a decrease ration is maintained in the first section, a virtual post-correction pure yellow point CY1 is located in the undefined data distribution section. Thus, since the color cannot be represented, it may be corrected by changing the decrease ratio in the second section. The reason that the first section and the second section have different decrease-ratio slopes is as follows. Since there is no recognizable difference in color concentration as the color is similar to pure yellow, a decrease ratio for such a part may be kept small. On the other hand, a user may more easily recognize a part similar to a normal white-yellow color, thus a decrease-ratio slope may increase to clearly convey a color difference to a user. The first section and the second section may apply different decrease-ratio slopes depending on the situation.

Figure 6A:
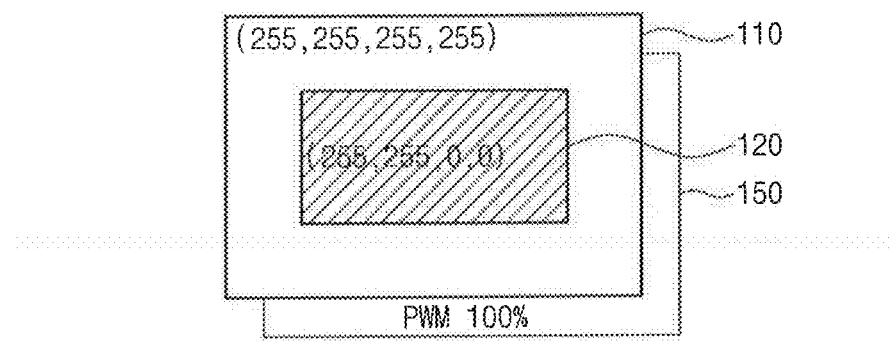
FIGS. 6A and 6B are plane views of a normal screen and a screen corrected by a method of correcting the saturated color as shown in FIG. 4.
Figure 6B:
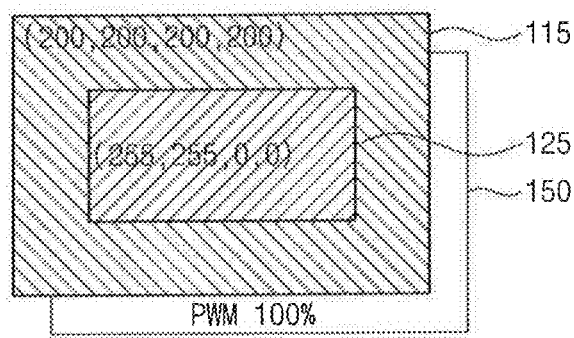

FIGS. 6A and 6B are plane views of a normal screen and a screen corrected by a method of correcting the saturated color as shown in FIG. 4.

FIG. 6A represents a display apparatus that has a white background image 110 and a yellow image 120 on a central part. A backlight 150 applied to the display apparatus supplies a uniform brightness.

The white background image 110 outputs output image data values that include second main colors whose data values are 255, 255, 255 and 255 for red R, green G, blue B and white W, respectively. In this example, the brightness of each color is represented with values 0 to 255 and the value 255 represents a maximum brightness.

In addition, the yellow image 120 outputs output image data values that include second main colors whose data values are 255, 255, 0 and 0 for red R, green G, blue B and white W, respectively. As already mentioned, the white image 110 represents a white that is two times brighter than a normal white generated by red R, green G and blue B because it includes an additional white W not generated by red R, green G and blue B colors. However, since the yellow image 120 generates a yellow color only from red R and green G, it represents a yellow color with normal brightness which is half the brightness of the white image 110. Thus, the yellow image 120 is recognized as relatively dark.

FIG. 6B represents a display apparatus that has a post-correction-white background image 115 and a yellow image 125 on the central part. The backlight 150 applied to the display apparatus supplies a uniform brightness.

When compared to the screen shown in FIG. 6A, the white background image 115 has been corrected. The white image 115 has values 200, 200, 200 and 200 for red R, green G, blue B and white W, respectively, which are about 78% of the pre-corrected values 255, 255, 255 and 255 for red R, green G, blue B and white W, respectively. In this case, white is represented as the same color but with slightly decreased brightness. Since the post-correction white image 115 is decreased in brightness, the yellow image 125 looks relatively brighter. Thus, it is possible to correct the display distortion experienced by a user who perceives converted output image data.

Figure 7:
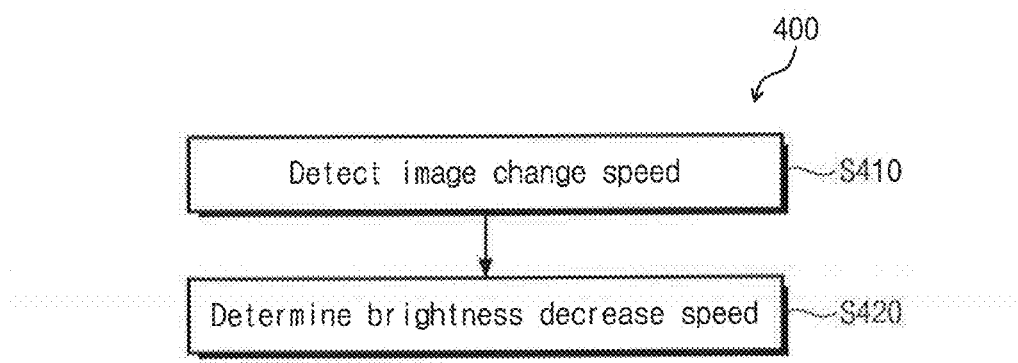
FIG. 7 is a flowchart of a delayed correction operation of shown in FIG. 1 in a method of driving an image according to an embodiment of the present disclosure.

FIG. 7 is a flowchart of a delayed correction operation of FIG. 1 in a method of driving an image according to an embodiment of the present disclosure.

Referring to FIG. 7, a delayed correction step S400 may include detecting an image change speed in step S410 and determining a brightness decrease speed in step S420.

Detecting the image change speed in step S410 includes detecting the image change speed based on a histogram analysis result of the frame image data of the output image data. For example, through a histogram analysis of corresponding output frame data for a preset frame section, the number of times the second main colors change from a saturated color to a non-saturated color (or vice versa) is determined to detect the image change speed.

In this example, the saturated color may be yellow and the non-saturated color may be a gray value between black and white without a hue.

For example, when yellow and white are alternately output for ten frames, namely, each for a total of five frames, it may be determined that an image change is fast, and when yellow is output for five frames and then white is output for five frames, it may be determined that the image change is slow.

Determining the brightness decrease speed in step S420 includes determining the brightness decrease speed in proportion to the image change speed. In particular, in step S420, when the image change is relatively fast, the brightness decrease speed may increase, and when the image change is relatively slow, the brightness decrease speed may decrease. The brightness decrease speed may be defined as increasing as a brightness decrease amount increases.

Figure 8A:
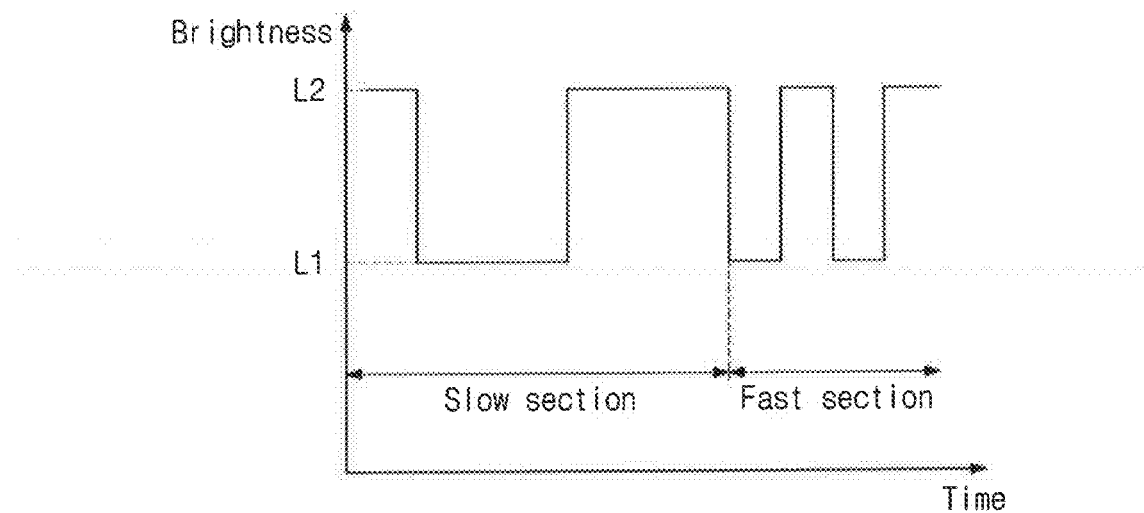
FIG. 8A shows saturated color correction over time when a delayed correction operation is not applied.
Figure 8B:
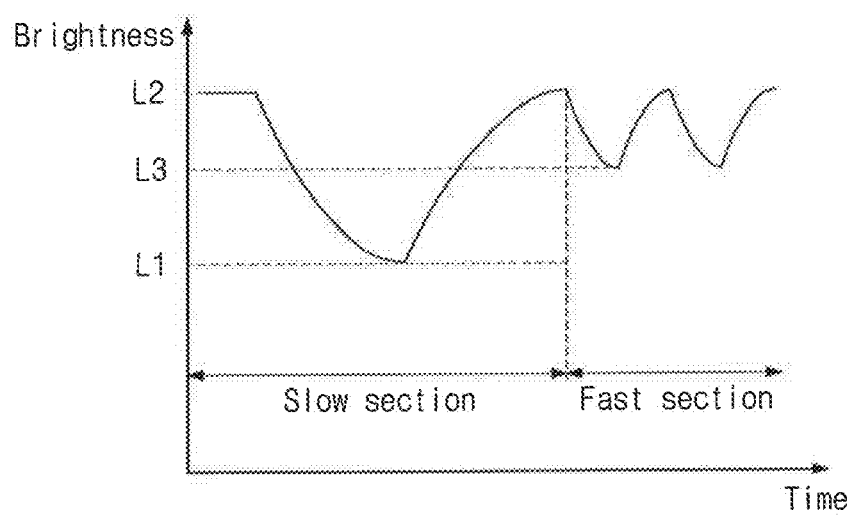
FIG. 8B shows saturated color correction over time after a delayed correction operation is applied in a comparative example.
Figure 8C:
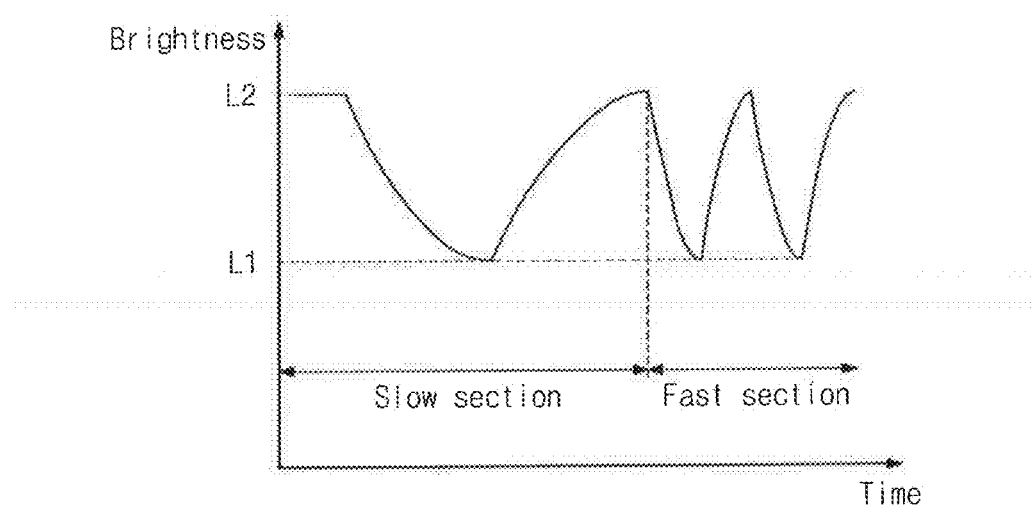
FIG. 8C shows saturated color correction over time after a delayed correction operation of FIG. 7 is applied.

FIG. 8A shows saturated color correction over time when a correction operation is not delayed, FIG. 8B shows saturated color correction over time after a delayed correction operation is applied in a comparative example, and FIG. 8C shows saturated color correction over time after a delayed correction operation of FIG. 7 is applied.

In FIGS. 8A to 8C, output image data may include a saturated color and a non-saturated color that are alternately output. When the saturated color is output, brightness correction is performed for the saturated color, and when the non-saturated color is output, brightness correction is not performed for the saturated color.

In the output image data, a change speed of the saturated color to the non-saturated color or vice versa is slow in a slow section, and may be fast in a fast section.

In FIG. 8A, since delayed correction is not applied, the brightness of output image data may have a post-correction brightness L1 immediately after a change from the non-saturated color to the saturated color, and may have pre-correction brightness L2 immediately after a change from the saturated color to the non-saturated color.

In FIG. 8B, delayed correction is performed in the slow section and the fast section to have a uniform delay speed. Since a change speed between the saturated color and the non-saturated color is relatively slow in the slow section, output image data may have a desired post-correction brightness L1 and then a pre-correction brightness L2 when changing from a non-saturated color to a saturated color and then back to a non-saturated color.

However, since a change speed between the saturated color and the non-saturated color is relatively fast in the fast section, the output image data may have an intermediate brightness L3 greater than the desired post-correction brightness L1 and then a pre-correction brightness L2 when changing from a non-saturated color to a saturated color and then back to a non-saturated color. Since the brightness of the output image data decreases only to the intermediate brightness L3 in the fast section, the effect of correcting a saturated color decreases.

In FIG. 8C, delayed correction is performed in the slow section and the fast section with different delay speeds. Since a change speed between the saturated color and the non-saturated color is relatively slow in the slow section, a delayed correction is relatively slowly applied as compared to the fast section. Even though the delayed correction is slower, the output image data may have desired post-correction brightness L1.

Since a change speed between the saturated color and the non-saturated color is relatively fast in the fast section, a delayed correction is relatively quickly applied as compared to the slow section. Thus, a change speed between pre-correction brightness L2 and post-correction brightness L1 in the fast section may be faster as compared to the slow section. Let the correction of a saturated color over time have an exponential function waveform of the form of "$y=e^{a \cdot x}$" or a linear function waveform of the form of "$y=a \cdot x$". Then, the slow section and the fast section may have different magnitudes for "a". Thus, by quickly applying a correction delay in the fast section, output image data may have the desired post-correction brightness L1 to maximize the correction of a saturated color.

Figure 9:
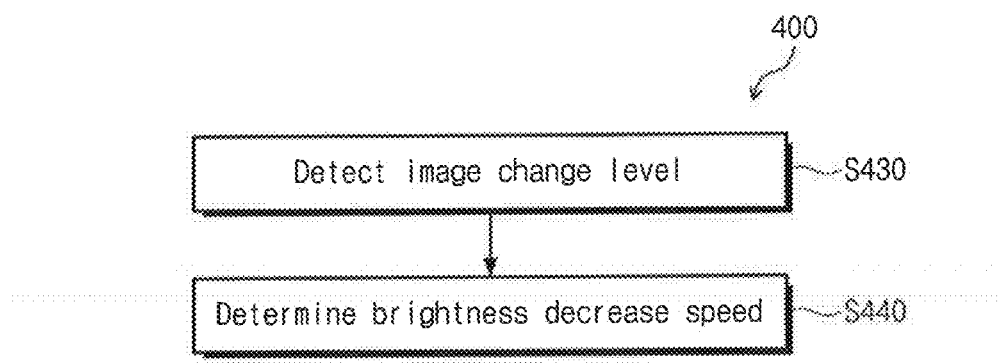
FIG. 9 is a flowchart of a delayed correction operation of FIG. 1 in a method of driving an image according to an embodiment of the present disclosure.

FIG. 9 is a flowchart of a delayed correction operation as shown in FIG. 1 in a method of driving an image according to an embodiment of the present disclosure.

Referring to FIG. 9, a delayed correction step S400 may include detecting an image change level in step S430 and determining a brightness decrease speed in step S440.

Detecting the image change level in step S430 includes detecting the image change level based on a histogram analysis of the frame image data of the output image data. For example, by comparing the histogram analysis of output frame data of a previous frame with the histogram analysis of the output frame data of the current frame, a ratio of saturated colors in the output frame data is determined to detect the image change. In other words, the image change level is detected by comparing a ratio of saturated colors in the output image data of the previous frame with a ratio of saturated colors in the output image data of the current frame.

In this example, the saturated color may be yellow and the non-saturated color may be a gray value between black and white without a hue.

For example, when the output frame data of the previous frame includes white and the output frame data of the current frame includes yellow, it may be determined that an image change level is significant. In addition, when the output frame data of the previous frame includes white and the output frame data of the current frame includes white and yellow in the ratio of 90%:10%, it may be determined that an image change level is low.

Determining the brightness decrease speed in step S440 includes determining the brightness decrease speed in proportion to the image change level. In particular, in step S440, when the image change level is relatively significant, the brightness decrease speed may increase, and when the image change level is relatively low, the brightness decrease speed may decrease. The brightness decrease speed may be defined as increasing as a brightness decrease amount increases.

Figure 10A:
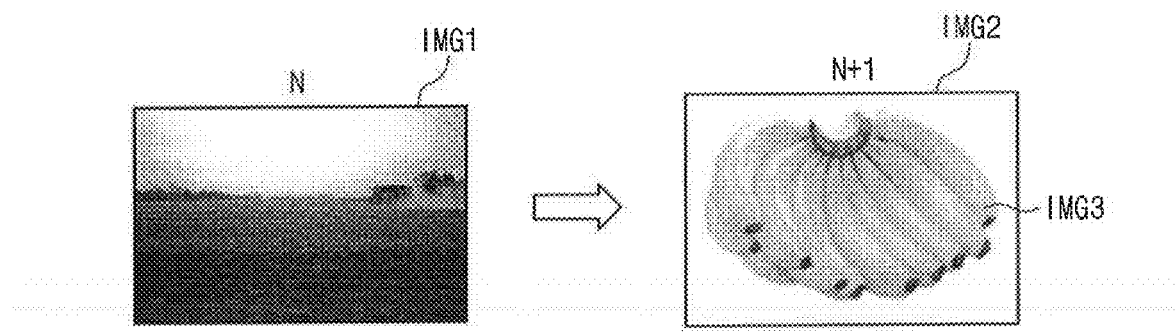
FIGS. 10A to 10C show a delayed correction operation of FIG. 9 when an image change level is relatively significant.
Figure 10B:
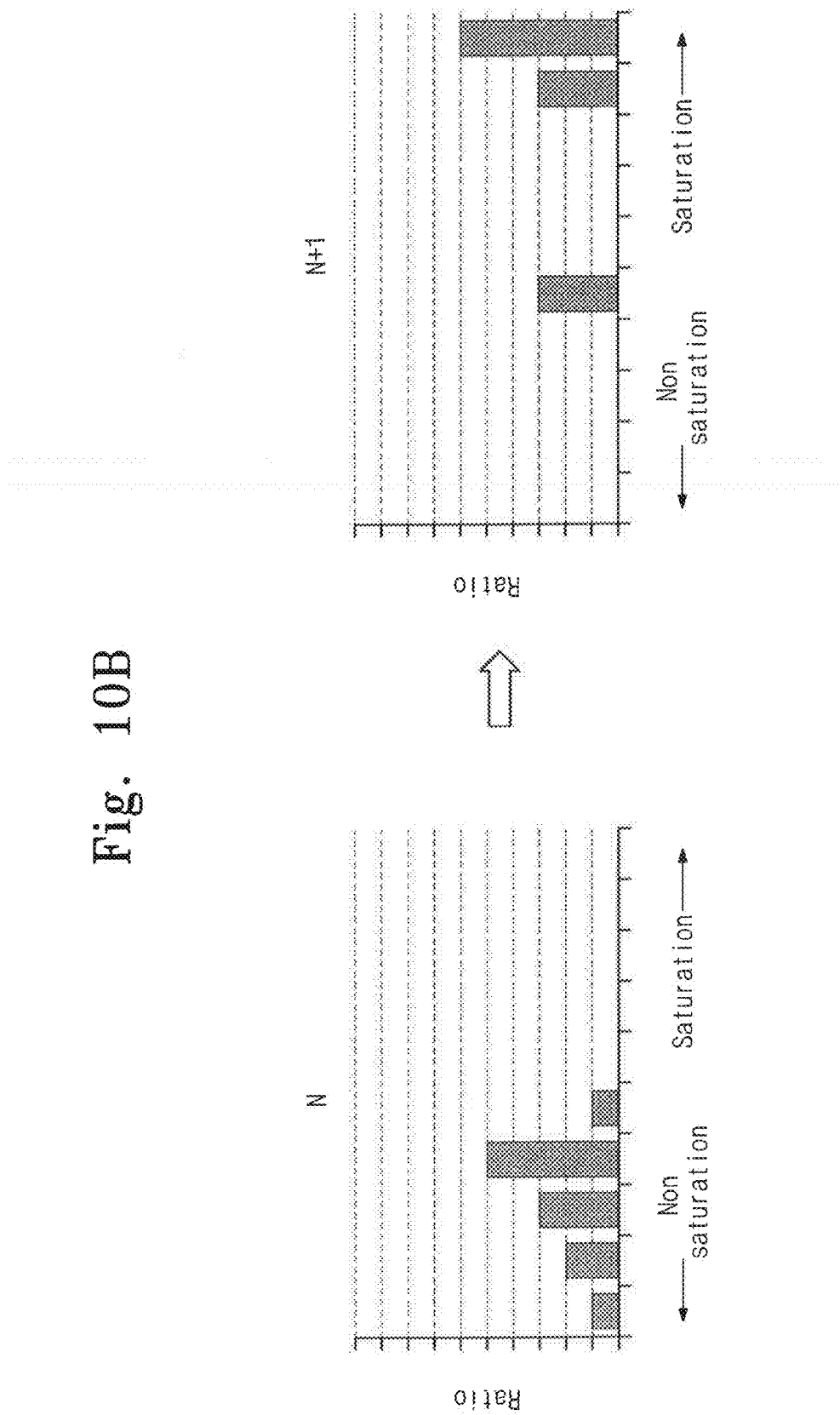
Figure 10C:
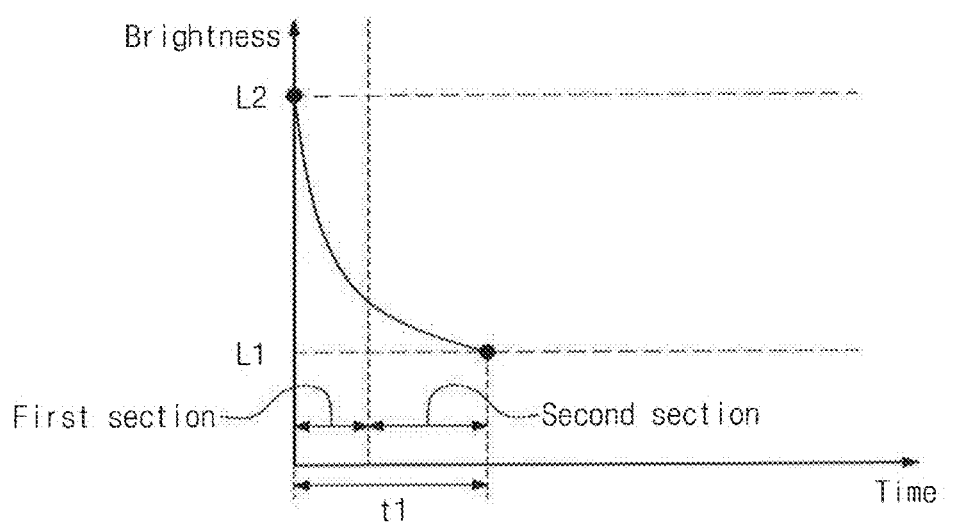
Figure 11A:
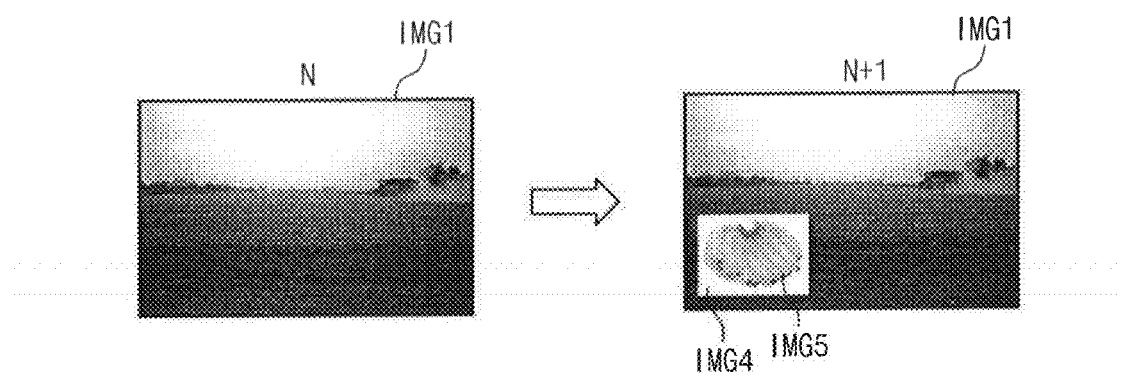
FIGS. 11A to 11C show a delayed correction operation of FIG. 9 when a variation in an image is relatively slight.
Figure 11B:
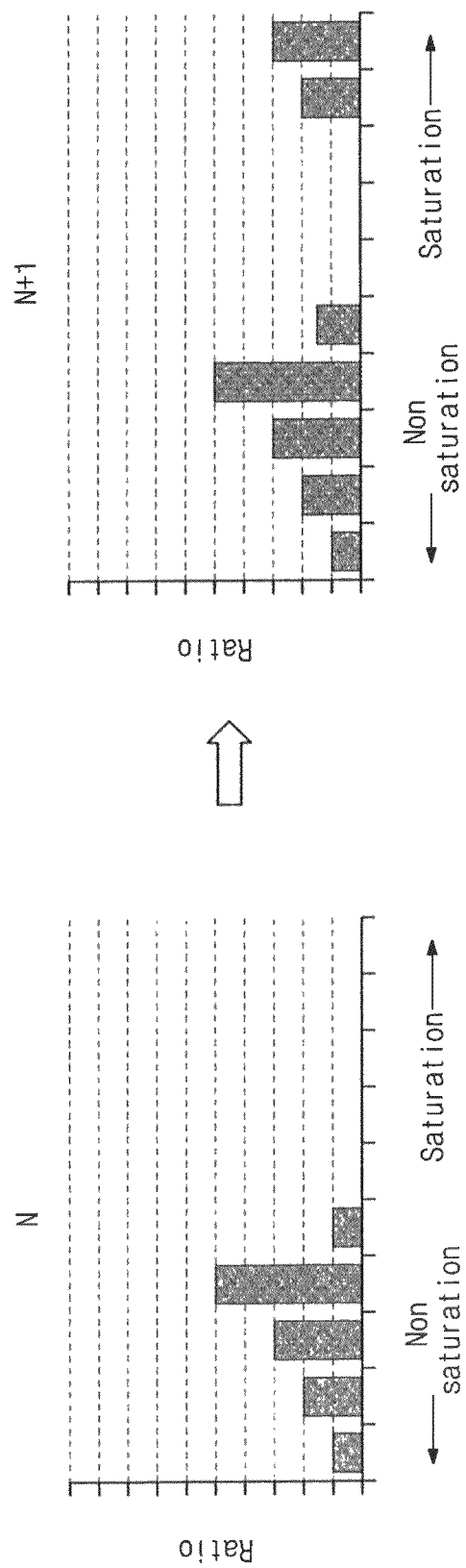
Figure 11C:
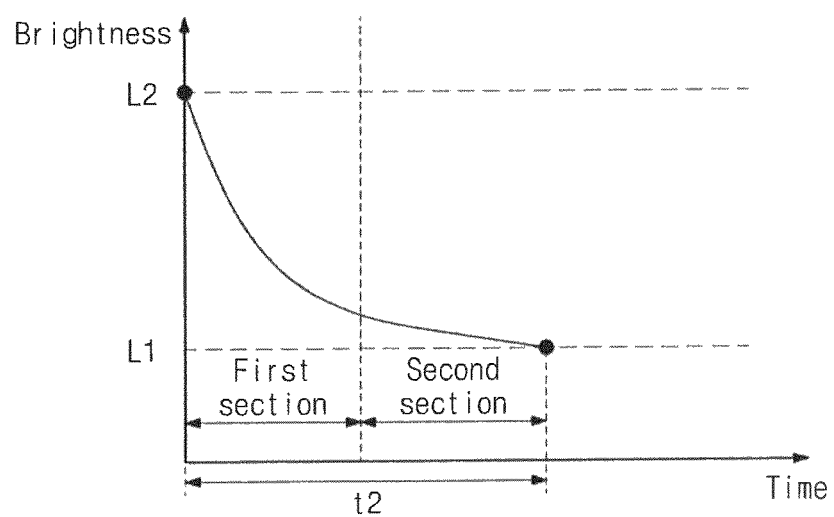

FIGS. 10A to 10C show a delayed correction operation of FIG. 9 when the image change level is relatively significant, and FIGS. 11A to 11C show a delayed correction operation of FIG. 9 when the image change level is relatively low.

FIGS. 10A and 11A show the output frame data of the previous frame and the output frame data of the current frame, FIGS. 10B and 11B show the histogram analysis result of the output frame data of the previous frame and the histogram analysis result of the output frame data of the current frame, and FIGS. 10C and 11C show brightness decrease speeds.

Firstly, an operation of delayed correction when an image change level is relatively significant is described with reference to FIGS. 10A to 10C.

Referring to FIG. 10A, the output frame data N of the previous frame may be an achromatic image IMG1 and the output frame data N+1 of the current frame may include a white background image IMG2 and a primarily yellow image IMG3 of, for example, bananas.

Referring to FIG. 10B, the output frame data N of the previous frame includes mostly non-saturated colors. On the other hand, the output frame data N+1 of the current frame includes mostly saturated colors.

In step S430 of FIG. 9 the image change level is detected as being relatively significant, and in step S440, the brightness decrease speed is increased.

Referring to FIG. 10C, the brightness of the output image data decreases from pre-correction brightness L2 to post-correction brightness L1 for a first decrease section t1. The first decrease section t1 may be shorter than a second decrease section t2 to be described below with respect to FIG. 11C.

In addition, the first decrease section t1 may be divided into a first section and a second section that have different brightness decrease ratios. To understand the first section and the second section, refer to descriptions of the first section and the second section shown in FIG. 5.

The operation of delayed correction when an image change level is relatively low is described with reference to FIGS. 11A to 11C.

Referring to FIG. 11A, the output frame data N of the previous frame may be an achromatic image IMG1 and the output frame data N+1 of the current frame may be obtained by replacing a portion of the achromatic image IMG1 with a white background image IMG4 and a primarily yellow image IMG5. It may be assumed that the background image IMG4 and the yellow image IMG5 of FIG. 11A are the same as the background image IMG2 and the yellow image IMG3 of FIG. 10A except for a difference in scale.

Referring to FIG. 11B, the output frame data N of the previous frame includes mostly non-saturated colors. On the other hand, the output frame data N+1 of the current frame includes a certain ratio of non-saturated colors and a certain ratio of saturated colors.

In step S430 of FIG. 9, histogram analysis is used to detect that the image change level is relatively low, and in step S440, the brightness decrease speed is decreased.

Referring to FIG. 11C, the brightness of the output image data decreases from pre-correction brightness L2 to post-correction brightness L1 for the second decrease section t2. The second decrease section t2 may be longer than the first decrease section t1 shown in FIG. 10C.

In addition, the second decrease section t2 may be divided into a first section and a second section that have different brightness decrease ratios. For descriptions of the first section and the second section, refer to descriptions of the first section and the second section shown in FIG. 5.

Figure 12:
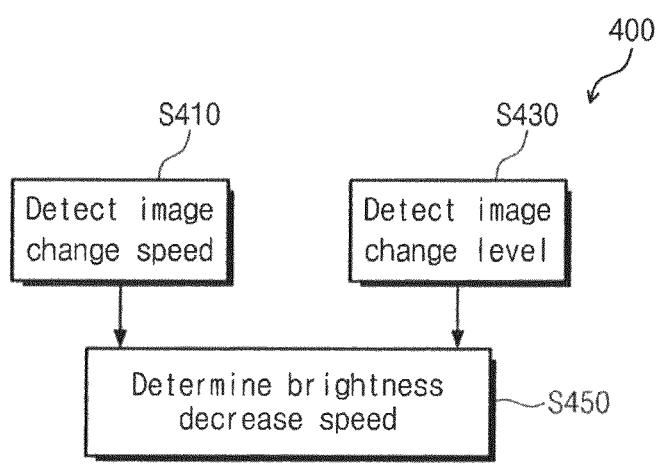
FIG. 12 is a flowchart of a delayed correction operation of FIG. 1 in a method of driving an image according to an embodiment of the present disclosure.

FIG. 12 is a flowchart of a delayed correction operation as shown in FIG. 1 in a method of driving an image according to an embodiment of the present disclosure.

Referring to FIG. 12, a delayed correction in step S400 may include detecting an image change speed in step S410, detecting an image change level in step S430, and determining a brightness decrease speed in step S450.

Since detecting the image change speed in step S410 is described with respect to FIGS. 7 to 8C, related detailed descriptions are omitted.

Since detecting the image change level in step S430 is described with respect to FIGS. 9 to 11C, related detailed descriptions are omitted.

Determining the brightness decrease speed in step S450 includes determining the brightness decrease speed in proportion to the image change speed and the image change level. In particular, in step S450, when the image change is relatively fast, the brightness decrease speed may increase, and when the image change is relatively slow, the brightness decrease speed may decrease. In addition, in step S450, when the image change level is relatively significant, the brightness decrease speed may increase, and when the image change level is relatively low, the brightness decrease speed may decrease.

In determining the brightness decrease speed in step S450, priority may be given to either the image change speed or the image change level.

Figure 13:
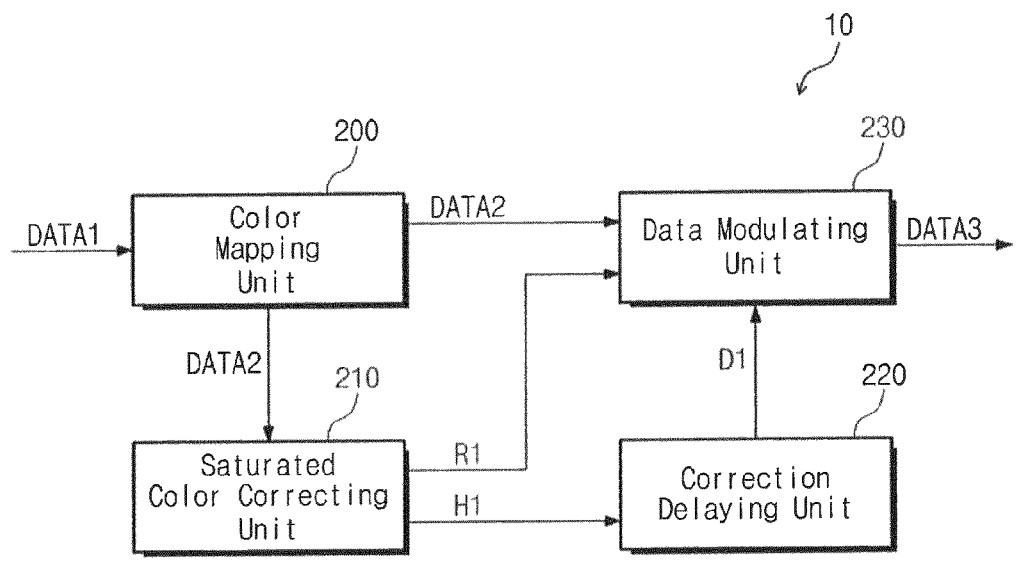
FIG. 13 is a block diagram of an apparatus for driving an image according to an embodiment of the present disclosure.

FIG. 13 is a block diagram of an apparatus for driving an image according to an embodiment of the present disclosure.

Referring to FIG. 13, an image driving apparatus 10 includes a color mapping unit 200, a saturated color correcting unit 210, a correction delaying unit 220, and a data modulating unit 230.

The color mapping unit 200 receives fundamental image data DATA1 and generates output image data DATA2. The fundamental image data DATA1 includes a plurality of first main colors and the output image data DATA2 includes a plurality of second main colors. The second main colors included in the output image data DATA2 may be different from the first main colors, and may have a different brightness.

The saturated color correcting unit 210 analyzes the output image data DATA2 and outputs a histogram analysis resultH1. In addition, the saturated color correcting unit 210 determines a brightness decrease ratio R1 of a saturated color of the second main colors based on the histogram analysis resultH1.

When the data modulating unit 230 corrects the brightness of the output image data DATA2 by the brightness decrease ratio R1, the correction delaying unit 220 delays a time for reaching the desired brightness so that a user does not recognize the brightness change. The correction delaying unit 220 may receive the histogram analysis resultH1 and determine a brightness decrease speed D1 based on at least one of an image change speed and an image change level that are detected.

The data modulating unit 230 generates modulated image data DATA3 obtained by decreasing the brightness value of the second main colors of the output image data DATA2 based on the brightness decrease ratio R1 and the brightness decrease speed D1.

Figure 14:
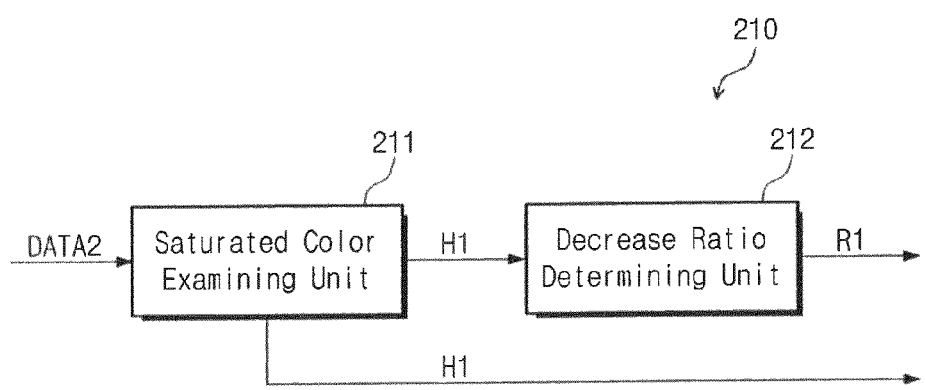
FIG. 14 is a block diagram of a saturated color correcting unit of FIG. 13.

FIG. 14 is a block diagram of the saturated color correcting unit 210 of FIG. 13;

Referring to FIG. 14, the saturated color correcting unit 210 may include a saturated color examining unit 211 and a decrease ratio determining unit 212.

The saturated color examining unit 211 analyzes the saturation of the second main colors of the output image data DATA2 and outputs the histogram analysis resultH1. In this case, the saturated color examining unit may perform a histogram analysis of the frame image data of the output image data DATA2.

The decrease ratio determining unit 212 determines the brightness decrease ratio of a saturated color of the second main colors based on the histogram analysis result H1.

Figure 15:
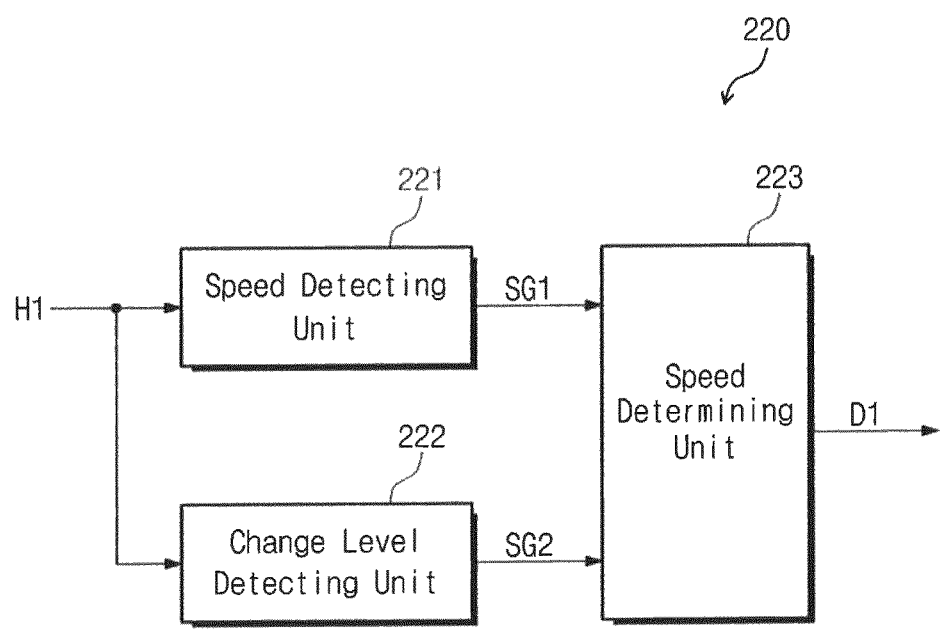
FIG. 15 is a block diagram of a saturated color correcting unit of FIG. 13.

FIG. 15 is a block diagram of the correction delaying unit 220 of FIG. 13.

Referring to FIG. 15, the correction delaying unit 220 may include a speed detecting unit 221, a change level detecting unit 222 and a speed determining unit 223.

The speed detecting unit 221 detects an image change speed SG1 based on the histogram analysis result H1 of the frame image data of the output image data.

The change level detecting unit 222 detects an image change level SG2 based on the histogram analysis result H1 of the frame image data of the output image data.

The speed determining unit 223 determines the brightness decrease speed in proportion to the image change speed SG1 and the image change level SG2. In particular, when an image change is relatively fast, the speed determining unit 223 may increase a brightness decrease speed, and when the image change is relatively slow, the speed determining unit 223 may decrease the brightness decrease speed. In addition, when the image change level is relatively significant, the speed determining unit 223 may increase the brightness decrease speed, and when the image change level is relatively low, the speed determining unit 223 may decrease the brightness decrease speed.

In determining the brightness decrease speed, the speed determining unit 223 may give priority to either the image change speed or the image change level.

Figure 16:
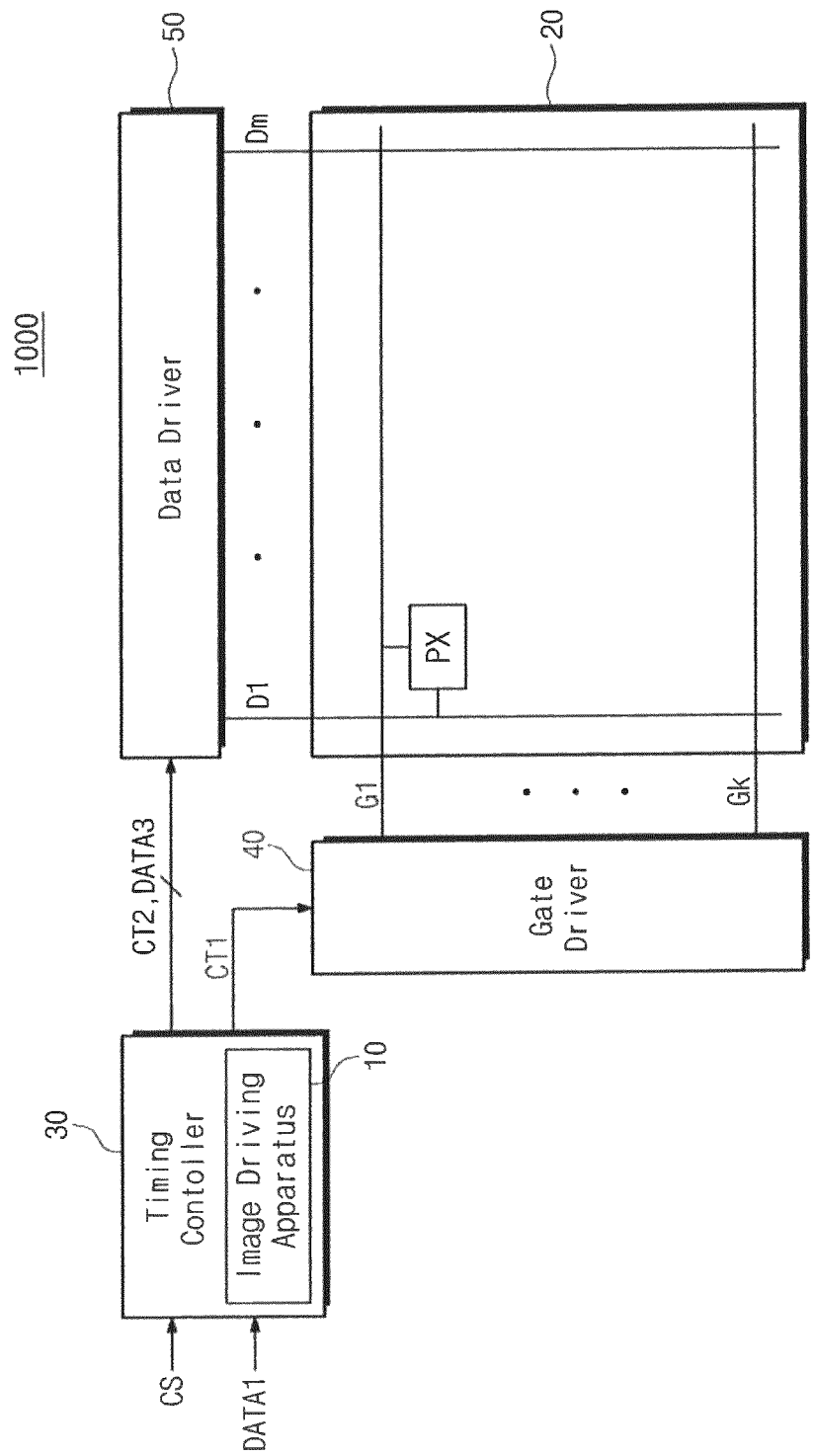
FIG. 16 is a block diagram of a display apparatus including an apparatus for driving an image according to an embodiment of the present disclosure.

FIG. 16 is a block diagram of a display apparatus including an apparatus for driving an image according to an embodiment of the present disclosure.

Referring to FIG. 16, a display apparatus 1000 may include a display panel 20, a timing controller 30, a gate driver 40, and a data driver 50.

The display panel 20 can display an image. The display panel 20 may be any one of various types of display panels, such as a liquid crystal display panel, an organic light-emitting display panel, an electrophoretic display panel, or an electrowetting display panel. If the display panel 20 is a non-emissive display panel such as a liquid crystal display, the display apparatus 1000 may further include a backlight unit that provides a light to the display panel 20.

The display panel 20 includes a plurality of gate lines G1 to Gk that receive gate signals, and a plurality of data lines D1 to Dm that receive data voltages. The gate lines G1 to Gk and the data lines D1 to Dm are insulated from each other and cross each other. A plurality of pixel regions arranged in a matrix form are defined on the display panel 20 and a plurality of pixels PX are respectively arranged in the plurality of pixel regions. Each of the pixels PX may be connected to one of the gate lines G1 to Gk and to one of the data lines D1 to Dm.

The timing controller 30 receives the fundamental image data DATA1 and a control signal CS from an external graphic controller.

The timing controller 30 receives the control signal CS, e.g., a vertical synchronization signal, a horizontal synchronization signal, main clock, or a data enable signal and outputs a first control signal CT1 and a second control signal CT2.

In this case, the first control signal CT1 may be a gate control signal for controlling the operation of the gate driver 40. The first control signal CT1 may include gate clock and a vertical start signal.

In addition, the second control signal CT2 may be a data control signal for controlling the operation of the data driver 50. The second control signal CT2 may include a horizontal start signal for starting the operation of the data driver 50, an inverse signal for inversing the polarity of a data voltage, and an output indication signal for determining when the data voltage is output from the data driver 50.

The timing controller 30 may include an image driving apparatus 10 according to an embodiment of the disclosure.

The image driving apparatus 10 generates the modulated image data DATA3 based on the fundamental image data DATA1. Refer to FIGS. 13 to 15 for the detailed descriptions of the image driving apparatus 10.

The gate driver 40 is electrically connected to the gate lines G1 to Gk on the display panel 20 and provides gate signals to the gate lines G1 to Gk. In particular, the gate driver 40 generates the gate signals for driving the gate lines G1 to Gk based on the first control signal CT1 and sequentially outputs generated gate signals to the gate lines G1 to Gk.

The data driver 50 outputs, to the data lines D1 to Dm, a data voltage obtained by converting the modulated image data DATA3 based on the second control signal CT2.

According to the present disclosure, for a saturated color, the brightness of the corresponding main colors decreases by a uniform ratio. Thus, it is possible to prevent brightness from relatively decreasing and thus appearing darker.

In addition, by applying a correction delaying speed in proportion to an image change speed and an image change level, it is possible to maximize the correction of a saturated color.

While exemplary embodiments of the present disclosure have been described with reference to the accompanying drawings, a person skilled in the art will be able to understand that the present disclosure may be practiced in other particular forms without changing essential characteristics. Therefore, exemplary embodiments as described above should be understood as illustrative and not limiting in every aspect.

What is claimed is:

1. A method of correcting color brightness of an image of a display apparatus, the method comprising:
   receiving fundamental image data that includes a plurality of first main colors;
   converting the fundamental image data into output image data that includes a plurality of second main colors, wherein the first main colors include red, green and blue, and the second main colors include red, green, blue and white;
   calculating corrected brightness values of the second main colors that correct a decreased apparent brightness of all colors of the second main colors when the second main colors include a saturated color, wherein a saturated color has a maximum brightness value;
   delaying application of the calculated corrections based on a brightness decrease speed that is determined based on at least one of an image change speed and an image change level of the second main colors; and
   displaying the corrected brightness values of the second main colors on a display monitor,
   wherein delaying application of the calculated corrections comprises:

increasing the brightness decrease speed when the image change speed between the saturated color and a non-saturated color is faster than a predetermined value; and decreasing the brightness decrease speed when the image change speed between the saturated color and the non-saturated color is slower than the predetermined value.

2. The method of claim 1, wherein delaying application of the calculated corrections further comprises:

detecting an image change speed based on a histogram analysis of the output image data.

3. The method of claim 2, wherein detecting the image change speed comprises determining a number of times the second main colors change from a saturated color to a non-saturated color or vice versa for a preset frame section.

4. The method of claim 1, wherein delaying application of the calculated corrections comprises:

detecting an image change level based on a histogram analysis of the output image data; and determining a brightness decrease speed in proportion to the image change level.

5. The method of claim 4, wherein detecting the image change level comprises comparing a ratio of saturated colors in the output image data of a previous frame with a ratio of saturated colors in the output image data of a current frame.

6. The method of claim 1, wherein delaying application of the calculated corrections comprises:

detecting an image change speed based on a histogram analysis of the output image data;

detecting an image change level based on a histogram analysis of the output image data; and determining a brightness decrease speed in proportion to the image change speed and the image change level.

7. The method of claim 1, wherein calculating corrected brightness values of the second main colors comprises:

examining saturated colors by analyzing a degree of saturation of each of the second main colors of the output image data;

determining a decrease ratio of a brightness value of a saturated color; and calculating a corrected brightness value of the second main colors of the output image data using the determined decrease ratio.

8. The method of claim 7, wherein a saturated second main color of the output image data is yellow.

9. An apparatus for correcting color brightness in the display of an image, the apparatus comprising:

a display panel comprising gate lines and data lines, wherein the gate lines and the data lines are insulated from each other and cross each other;

a timing controller configured to receive fundamental image data and a control signal and to generate modulated image data, a first control signal, and a second control signal, wherein the timing controller includes an image driving apparatus;

a gate driver configured to output to the gate lines, gate signals generated based on the first control signal; and a data driver configured to output to the data lines, data voltage obtained from the modulated image data based on the second control signal, wherein the image driving apparatus comprises:

a color mapping unit configured to receive fundamental image data that includes a plurality of first main colors and to convert the received fundamental image data into output image data that includes a plurality of second main colors, wherein the plurality of first main colors include red, green and blue, and the plurality of second main colors include red, green, blue and white;

a saturated color correcting unit configured to perform a histogram analysis on the output image data and to output a histogram analysis result, wherein the saturated color correcting unit determines a brightness decrease ratio of saturated second main colors of the plurality of second main colors based on the histogram analysis result, wherein each of the saturated second main colors has a maximum brightness value;

a correction delaying unit configured to determine a brightness decrease speed based on at least one of an image change speed and an image change level of the second main colors that are detected based on the histogram analysis result, increase the brightness decrease speed when the image change speed between the saturated color and a non-saturated color is faster than a predetermined value; and decrease the brightness decrease speed when the image change speed between the saturated color and the non-saturated color is slower than the predetermined value; and a data modulating unit configured to generate modulated image data by decreasing brightness values of the plurality of second main colors of the output image data based on the brightness decrease ratio and the brightness decrease speed.

10. The apparatus of claim 9, wherein the saturated color correcting unit comprises:

a saturated color examining unit configured to analyze a degree of saturation of each of the second main colors of the output image data and to output the histogram analysis result; and a decrease ratio determining unit configured to determine a brightness decrease ratio of a saturated second main color based on the histogram analysis result.

11. The apparatus of claim 9, wherein the correction delaying unit comprises:

a speed detecting unit configured to detect an image change speed based on the histogram analysis result;

a change level detecting unit configured to detect an image change level based on the histogram analysis result; and a speed determining unit configured to determine a brightness decrease speed in proportion to the image change speed and the image change level.

12. A method of correcting color brightness of an image of a display apparatus, the method comprising:

examining saturated colors of a plurality of second main colors of an output image data by analyzing a degree of saturation of each of the second main colors of the output image data, wherein the plurality of first main colors include red, green and blue, and the plurality of second main colors include red, green, blue and white, and each of the saturated colors has a maximum brightness value;

determining a decrease ratio of a brightness value of the saturated colors of the second main colors;

calculating a corrected brightness value of the second main colors of the output image data using the determined decrease ratio;

delaying application of the corrected brightness values based on a brightness decrease speed that is determined in proportion to at least one of an image change speed and an image change level of the second main colors; and displaying the corrected brightness values of the second main colors on a display monitor, wherein delaying application of the calculated corrections comprises:
increasing the brightness decrease sped when the image change speed between the saturated color and a non-saturated color is faster than a predetermined value; and
decreasing the brightness decrease speed when the image change speed between the saturated color and the non-saturated color is slower than the predetermined value.

13. The method of claim 12, further comprising:
receiving fundamental image data that includes a plurality of first main colors; and
converting the fundamental image data into the output image data that includes the plurality of second main colors.

14. The method of claim 12, wherein examining saturated colors of a plurality of second main colors of output image data further comprises performing a histogram analysis on the output image data and outputting a histogram analysis result, wherein the brightness value decrease ratio of a saturated second main color is determined based on the histogram analysis result.

15. The method of claim 14, wherein delaying application of the corrected brightness values further comprises determining the brightness decrease speed based on at least one of an image change speed and an image change level that are detected based on the histogram analysis result.

16. The method of claim 15, wherein detecting the image change speed comprises determining a number of times the second main colors change from a saturated color to a non-saturated color or vice versa for a preset frame section.

17. The method of claim 15, wherein detecting the image change level comprises comparing a ratio of saturated colors in the output image data of a previous frame with a ratio of saturated colors in the output image data of a current frame.

18. The method of claim 12, wherein a saturated second main color of the output image data is yellow.

* * * * *